US009226009B2

(12) United States Patent
Kinoshita et al.

(10) Patent No.: US 9,226,009 B2
(45) Date of Patent: Dec. 29, 2015

(54) INFORMATION PROCESSING APPARATUS AND METHOD, AND RECORDING MEDIA

(75) Inventors: Akihiko Kinoshita, Tokyo (JP); Takashi Kanao, Tokyo (JP); Hiroyuki Chiba, Kanagawa (JP); Tsuyoshi Honma, Chiba (JP); Hirofumi Kouda, Saitama (JP)

(73) Assignee: Sony Corporation, Tokyo (JP)

( * ) Notice: Subject to any disclaimer, the term of this patent is extended or adjusted under 35 U.S.C. 154(b) by 1436 days.

(21) Appl. No.: 12/388,143

(22) Filed: Feb. 18, 2009

(65) Prior Publication Data

US 2009/0265741 A1    Oct. 22, 2009

(30) Foreign Application Priority Data

Mar. 28, 2008  (JP) ................................. 2008-086140

(51) Int. Cl.
*H04N 21/237* (2011.01)
*H04N 21/81* (2011.01)
*H04N 21/436* (2011.01)
*H04N 21/4722* (2011.01)
*H04N 21/462* (2011.01)
*H04N 21/658* (2011.01)
*H04N 21/4725* (2011.01)
*H04N 21/482* (2011.01)
(Continued)

(52) U.S. Cl.
CPC ......... *H04N 21/237* (2013.01); *H04N 21/4316* (2013.01); *H04N 21/4325* (2013.01); *H04N 21/440209* (2013.01); *H04N 21/4622* (2013.01); *H04N 21/4722* (2013.01); *H04N 21/4725* (2013.01); *H04N 21/482* (2013.01); *H04N 21/6581* (2013.01); *H04N 21/8133* (2013.01); *H04N 21/258* (2013.01); *H04N 21/42646* (2013.01); *H04N 21/47214* (2013.01)

(58) Field of Classification Search
USPC ......... 725/37–55, 59, 133, 141, 153; 386/297
See application file for complete search history.

(56) References Cited

U.S. PATENT DOCUMENTS 6,324,694 B1 *  11/2001  Watts et al. .................... 725/32
6,601,238 B2 *   7/2003  Morrison et al. .............. 725/50
(Continued)

FOREIGN PATENT DOCUMENTS

JP    10-173612    6/1998
JP    10-210378    8/1998
(Continued)

*Primary Examiner* — Pankaj Kumar
*Assistant Examiner* — Usha Raman
(74) *Attorney, Agent, or Firm* — Oblon, McClelland, Maier & Neustadt, L.L.P.

(57) ABSTRACT

An information processing apparatus includes: a program distribution schedule information receiver configured to receive program distribution schedule information; a program-associated information acquirer configured to acquire, for each program listed in the program distribution schedule information, information for identifying content associated with the program and program-associated information including information for identifying a recording media to which the content is recorded; and a display controller configured to control displaying of a program guide by allocating a GUI (Graphical User Interface) for controlling a command for reproducing the content corresponding to the program into each display box of the program on the basis of the received program distribution schedule information and the acquired program-associated information.

10 Claims, 11 Drawing Sheets

(51) Int. Cl.
*H04N 21/472* (2011.01)
*H04N 21/431* (2011.01)
*H04N 21/432* (2011.01)
*H04N 21/4402* (2011.01)
*H04N 21/258* (2011.01)
*H04N 21/426* (2011.01)

(56) References Cited

U.S. PATENT DOCUMENTS

| | | | |
|---|---|---|---|
| 6,895,170 B1* | 5/2005 | Lambert et al. | 386/248 |
| 7,293,275 B1* | 11/2007 | Krieger et al. | 725/40 |
| 7,503,059 B1* | 3/2009 | Rothschild | 725/113 |
| 7,856,443 B2* | 12/2010 | Commons et al. | 707/759 |
| 8,640,179 B1* | 1/2014 | Cox | 725/115 |
| 8,661,469 B2* | 2/2014 | Gonder et al. | 725/39 |
| 2002/0066098 A1* | 5/2002 | Hamakawa | 725/39 |
| 2002/0108127 A1* | 8/2002 | Lew et al. | 725/142 |
| 2003/0041123 A1* | 2/2003 | Sato et al. | 709/219 |
| 2003/0061607 A1* | 3/2003 | Hunter et al. | 725/32 |
| 2003/0126605 A1* | 7/2003 | Betz et al. | 725/39 |
| 2004/0017388 A1* | 1/2004 | Stautner et al. | 345/716 |
| 2004/0128685 A1* | 7/2004 | Hassell et al. | 725/40 |
| 2004/0220926 A1* | 11/2004 | Lamkin et al. | 707/3 |
| 2004/0235567 A1* | 11/2004 | Chatani | 463/42 |
| 2004/0255330 A1* | 12/2004 | Logan | 725/115 |
| 2005/0022236 A1* | 1/2005 | Ito et al. | 725/39 |
| 2005/0044481 A1* | 2/2005 | Collart | 715/500.1 |
| 2005/0182828 A1* | 8/2005 | Lamkin et al. | 709/219 |
| 2005/0204398 A1* | 9/2005 | Ryal | 725/112 |
| 2006/0069827 A1* | 3/2006 | Kelly | 710/74 |
| 2006/0221173 A1* | 10/2006 | Duncan | 348/14.02 |
| 2007/0101375 A1* | 5/2007 | Haberman | 725/86 |
| 2007/0113264 A1* | 5/2007 | Rothschild | 725/135 |
| 2008/0159715 A1* | 7/2008 | Fuasaro et al. | 386/124 |
| 2009/0076821 A1* | 3/2009 | Brenner et al. | 704/260 |
| 2009/0254945 A1* | 10/2009 | Kinoshita et al. | 725/60 |
| 2009/0285562 A1* | 11/2009 | Yoon et al. | 386/95 |
| 2012/0173536 A1* | 7/2012 | Shahraray et al. | 707/741 |
| 2012/0204201 A1* | 8/2012 | Cassidy et al. | 725/10 |
| 2015/0074703 A1* | 3/2015 | Cremer et al. | 725/19 |

FOREIGN PATENT DOCUMENTS

| | | |
|---|---|---|
| JP | 2001-257953 | 9/2001 |
| JP | 2004-62916 | 2/2004 |
| JP | 2005-130075 | 5/2005 |
| JP | 2005-322362 | 11/2005 |
| JP | 2005-328400 | 11/2005 |
| JP | 2006-5850 | 1/2006 |
| JP | 2009-224897 | 10/2009 |

* cited by examiner

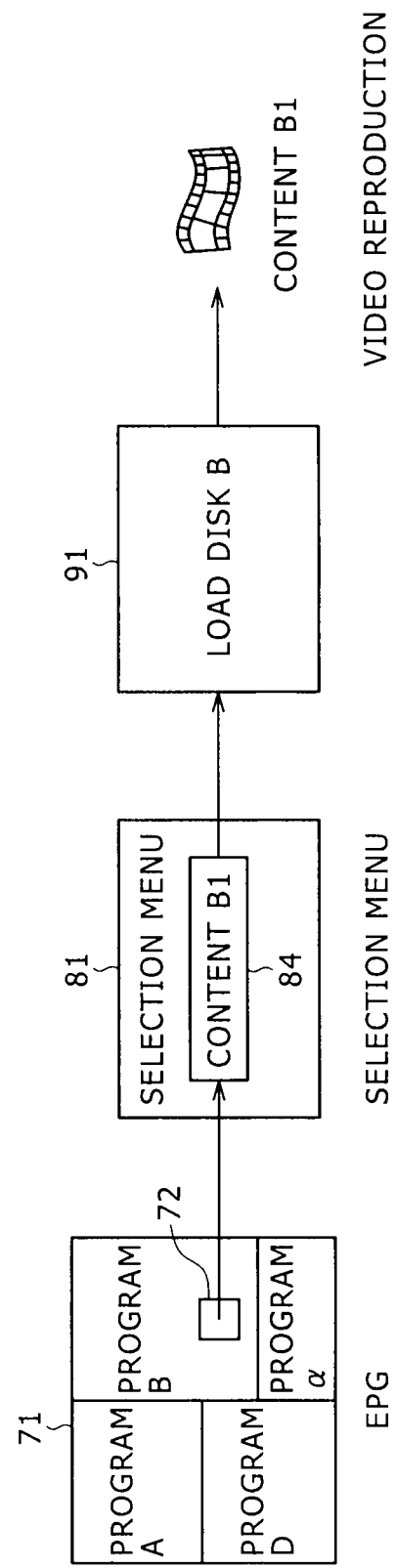

FIG.7

DECEMBER 2006 ISSUE - PROGRAM NOTICE

JANUARY 2007 ISSUE - COMMENTS OF HIGHLIGHT,
                     CAST INTERVIEW

FEBRUARY 2007 ISSUE - SYNOPSIS OF LAST MONTH,
                      HIGHLIGHT OF THIS MONTH

MARCH 2007 ISSUE - SYNOPSIS OF LAST MONTH,
                   HIGHLIGHT OF THIS MONTH

APRIL 2007 ISSUE - SYNOPSIS OF LAST MONTH,
                   HIGHLIGHT OF THIS MONTH

FIG.8

<BD DISK STORED CONTENT>

OCTOBER 2003 ISSUE - OSAKA TEAM VICTORY SCENE

OCTOBER 2004 ISSUE - NAGOYA TEAM VICTORY SCENE

OCTOBER 2005 ISSUE - OSAKA TEAM VICTORY SCENE

OCTOBER 2006 ISSUE - NAGOYA TEAM VICTORY SCENE

OCTOBER 2007 ISSUE - TOKYO TEAM VICTORY SCENE

INFORMATION PROCESSING APPARATUS AND METHOD, AND RECORDING MEDIA

CROSS REFERENCES TO RELATED APPLICATIONS

The present invention contains subject matter related to Japanese Patent Application JP 2008-086140 filed in the Japanese Patent Office on Mar. 28, 2008, the entire contents of which being incorporated herein by reference.

BACKGROUND OF THE INVENTION

1. Field of the Invention

The present invention relates to an information processing apparatus and method, and a recording media and, more particularly, to an information processing apparatus and method, and a recording media that are configured to provide audiences information that is more substantial to them.

2. Description of the Related Art

Recently, the popularization of an EPG (Electronic Program Guide) is conspicuous. This is because a user can easily check which program is broadcast on which channel simply by referencing an EPG.

Also, recently, program advertisement information for example is provided via a network, for which a technology is proposed for getting information (program information, such as channel and broadcast time zone) associated with a program recorded from a terminal of an EPG user and, on the basis of that information, displaying, in a column corresponding to the recorded program, a marker indicative that the program has already been recorded by the user to whom an EPG is provided (refer to Japanese Patent Laid-open No. 2005-328400 for example).

Also, another technology is proposed in which a disk management table is referenced to check if a disk ID (Identification Date) has already been recorded and additional information different from device to device is attached for disk management (refer to Japanese Patent Laid-open No. 2004-62916 for example).

SUMMARY OF THE INVENTION

It should be noted that the information that can be obtained from an EPG is only limited one; program titles and outlines, names of main casts, and so on, for example. However, there are many audiences who want to know the contents of programs in which leading actors of interest acted in the past or check the contents past broadcast of a series, for example.

For example, if the information desired by audiences is transmitted via a network for each of the huge number of programs to be broadcast by terrestrial digital broadcasting and satellite broadcasting, for example, the data to be transmitted would be enormous in quantity, which is not efficient in transmission when network transfer rates and other factors are taken into consideration.

Therefore, the present embodiment addresses the above-identified and other problems associated with related-art methods and apparatuses and solves the addressed problems by providing an information processing apparatus and method, and recording media that are configured to provide audiences with information that is relatively more substantial than that provided by related-art technologies.

In carrying out one embodiment of the invention, there is provided an information processing apparatus. This information processing apparatus has program distribution schedule information receiving means for receiving program distribution schedule information; and program-associated information acquiring means for acquiring, for each program listed in the program distribution schedule information, information for identifying content associated with the program and program-associated information including information for identifying a recording media to which the content is recorded. The information processing apparatus further has display control means for controlling displaying of a program guide by allocating a GUI (Graphical User Interface) for controlling a command for reproducing the content corresponding to the program into each display box of the program on the basis of the received program distribution schedule information and the acquired program-associated information.

The above-mentioned information processing apparatus further has determining means for determining whether the content is recorded to a recording media currently loaded on the information processing apparatus if the reproduction of the content is commanded through the GUI. If the content is found, by the determining means, recorded to the recording media loaded on the information processing apparatus, the reproduction of the content is controlled and, if the content is not found, by the determining means, recorded to the recording media loaded on the information processing apparatus, a recording media to which the content is recorded is identified on the basis of the program-associated information and displaying of information associated with the recording media is controlled.

In the above-mentioned information processing apparatus, a program corresponding to the reproduced content is identified on the basis of the program-associated information and displaying of an image of the content is controlled along with information associated with timer-recording of the program.

In carrying out another embodiment of the invention, there is provided an information processing method. This information processing method has the steps of receiving program distribution schedule information; and acquiring, for each program listed in the program distribution schedule information, information for identifying content associated with the program and program-associated information including information for identifying a recording media to which the content is recorded. The information processing method further has controlling displaying of a program guide by allocating a GUI (Graphical User Interface) for controlling a command for reproducing the content corresponding to the program into each display box of the program on the basis of the received program distribution schedule information and the acquired program-associated information.

In carrying out still another embodiment of the invention, there is provided a recording media recording a program configured to make a computer function as an information processing apparatus. This information processing apparatus has program distribution schedule information receiving means for receiving program distribution schedule information; program-associated information acquiring means for acquiring, for each program listed in the program distribution schedule information, information for identifying content associated with the program and program-associated information including information for identifying a recording media to which the content is recorded; and display control means for controlling displaying of a program guide by allocating a GUI (Graphical User Interface) for controlling a command for reproducing the content corresponding to the program into each display box of the program on the basis of the received program distribution schedule information and the acquired program-associated information.

In the above-mentioned recording media, the program and the content are recorded.

In the above-mentioned embodiments of the present invention, program distribution schedule information is received; and for each program listed in the program distribution schedule information, information for identifying content associated with the program and program-associated information including information for identifying a recording media to which the content is recorded are acquired. Displaying of a program guide is controlled by allocating a GUI (Graphical User Interface) for controlling a command for reproducing the content corresponding to the program into each display box of the program on the basis of the received program distribution schedule information and the acquired program-associated information.

As described and according to embodiments of the invention, information that is relatively more substantial than that provided by related art technologies can be provided to audiences.

BRIEF DESCRIPTION OF THE DRAWINGS

Other features of the invention will become apparent from the following description of embodiments with reference to the accompanying drawings in which:

FIG. 6 is a schematic diagram illustrating a display example of a program guide, a selection menu, and a dialog box;

FIG. 7 is a diagram illustrating a content example recorded to a disk;

FIG. 8 is a diagram illustrating another content example recorded to a disk;

DETAILED DESCRIPTION OF THE PREFERRED EMBODIMENTS

This embodiment will be described in further detail by way of embodiments thereof with reference to the accompanying drawings.

Figure 1:
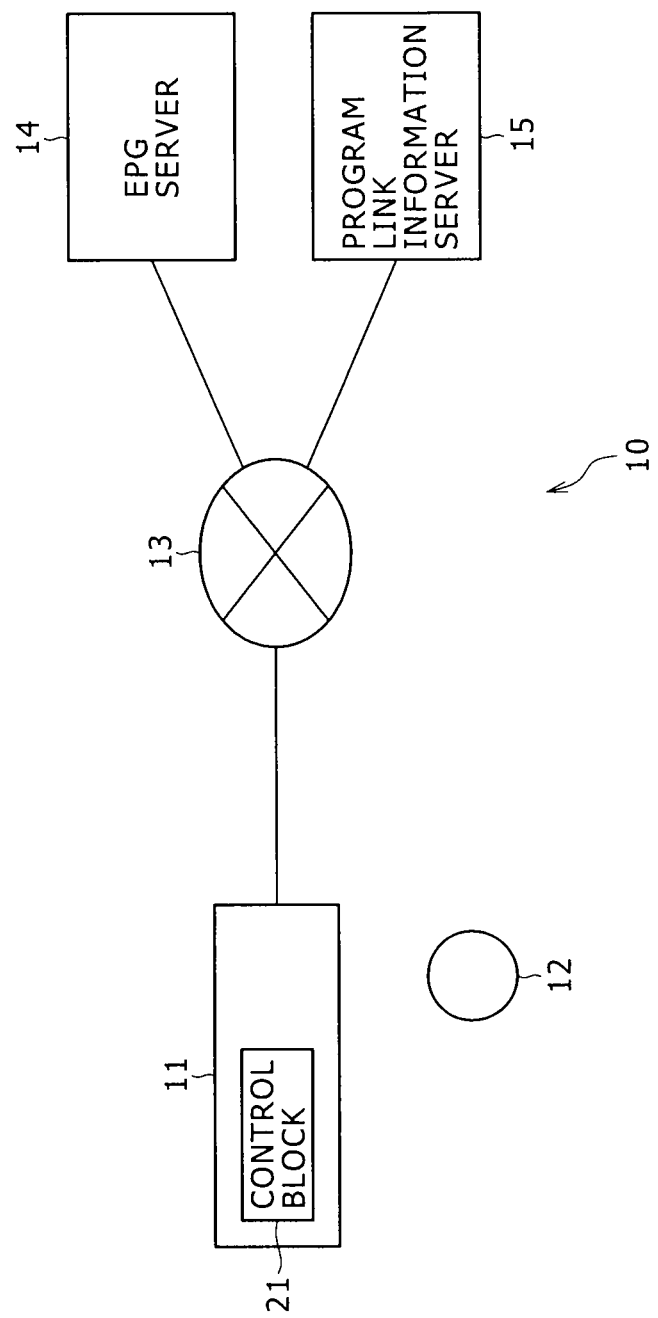
FIG. 1 is a block diagram illustrating an exemplary configuration of a network system practiced as one embodiment of the invention.

Now, referring to FIG. 1, there is shown a block diagram illustrating an exemplary configuration of the network system 10 practiced as one embodiment of the invention. The network system 10 is configured that a user of a terminal 11 downloads an EPG from an EPG server 14 via a network 13, such as the Internet, for example.

Also, the network system 10 is configured such that the terminal 11 that has downloaded an EPG downloads program link information from a program link information server 15 via the network 13, such as the Internet.

It should be noted that, instead of an EPG, another type of data indicative of the schedule of program broadcasting and distribution may be used. Namely, in the network system 10, program distribution schedule information including an EPG and an ECG (Electronic Content Guide) is downloaded. In what follows, the description will be made by use of an EPG an example.

A disk 12 provided to the user beforehand is loaded on the terminal 11, thereby reproducing content recorded to the disk 12 on the basis of the information contained in the EPG obtained from the EPG server 14, for example.

The terminal 11 is configured as a BD (Blu-ray Disc)™ player or a BD recorder, for example, and has a connection terminal to the network 13, such as the Internet.

The terminal 11 has a drive on which the disk 12 is loaded and reads data from the disk 12 loaded on the drive. If the disk 12 is a writable recording media, the terminal 11 may be configured to write data to the disk 12.

A control block 21 is the terminal 11 has a processor, a memory, and so on, thereby controlling the other components of the terminal 11. The control block 21 is configured to control the processing associated with the communication to be executed via the network 13 between the terminal 11 and the EPG server 14 or the program link information server 15.

The disk 12 is a Blu-ray Disc™, for example. While the recording capacities of related-art DVDs are around 4.7 GB, the recording capacity of the Blu-ray disc is as high as around 25 GB. Also, the disk 12 is recorded with a predetermined program beforehand. When the disk 12 is reproduced on the terminal 11, the program recorded to the disk 12 is executed by the control block 21.

The program recorded to the disk 12 beforehand is written in a programming language that is independent of the computer model and the OS (Operating System), for example, and compliant with networking. The program is made to be executable no matter what maker makes it or what the computer model is. This program may be produced by either a maker of the disk 12 or an online vendor, for example.

As compared with related-art DVDs, the Blu-ray disc is enhanced in the navigation feature for presenting disk recorded contents to the user and setting an operation as instructed by the user, for example. This navigation feature is realized by the execution of a program recorded to the Blu-ray disc (a disc 12) through the control block 21. To be more specific, various navigation features are realized by an application program group called a BD-J written in Java (trademark) program language.

In addition, the disk 12 is delivered to the user beforehand by a vendor that creates and edits EPGs, for example. Alternatively, the disk 12 may be provided to the user in the form of an appendix to a magazine, for example. The disk 12 is recorded with content that is data, such as the video and audio associated with programs to be broadcast, for example.

In embodiments of the present invention, program link information is used so as to relate the content recorded to the disk 12 with a predetermined program listed in an EPG. Namely, for example, program link information allows the easy reproduction of the content related with a predetermined program while the user is displaying an EPG on a display monitor of the terminal 11.

Figure 2:
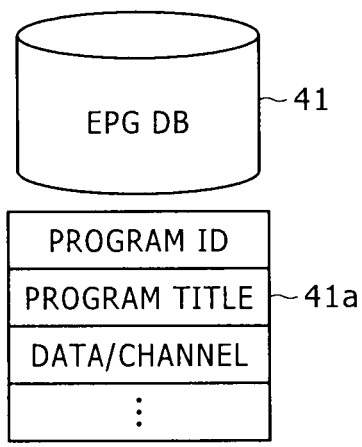
FIG. 2 is a diagram illustrating an exemplary configuration of a database of an EPG server shown in FIG. 1.

The EPG server 14 is configured to have an EPG database. FIG. 2 shows an exemplary configuration of an EPG DB 41. The EPG DB 41 is configured by two or more records 41a, for example.

In the example shown in FIG. 2, the record 41a is configured to have attributes of program ID, program title, date/CH, and so on. Attribute "program ID" is information such as a number unique to a program to be broadcast; for example, different numbers are assigned to programs to be broadcast in a series in accordance with the number of programs in the series. Attribute "program title" is the title of a program corresponding to that program ID. Attribute "date/CH" is information indicative of the date and channel on which a program corresponding to that program ID is broadcast.

Figure 3:
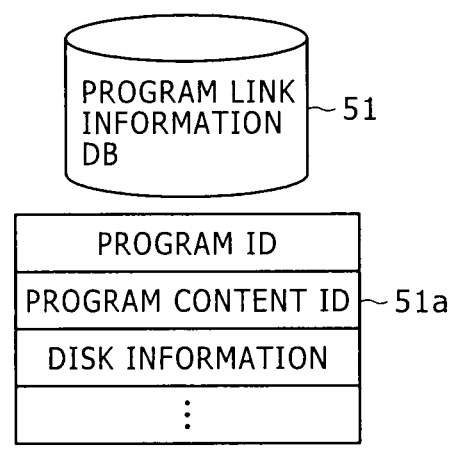
FIG. 3 is a diagram illustrating an exemplary configuration of a database of a program link information server shown in FIG. 1.

The program link information server 15 is configured to have a program link information database (DB). FIG. 3 shows an exemplary configuration of a program link information DB 51. The program link information DB 51 is configured by two or more records 51a, for example.

In the example shown in FIG. 3, the record 51a is configured to have attributes of program ID, program content ID, disk information, and so on. Attribute "program ID" is the same as the program ID of the record 41a shown in FIG. 2. Attribute "program content ID" is information for identifying the content related with a program corresponding to that program ID. Attribute "disk information" is information for identifying the disk 12 to which the content corresponding to that content ID is recorded.

Figure 4:
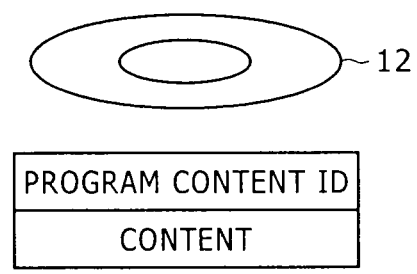
FIG. 4 is a diagram illustrating an exemplary configuration of content recorded to a disk shown in FIG. 1.

The content recorded to the disk 12 is recorded as corresponding to the program content ID as shown in FIG. 4.

Figure 5:
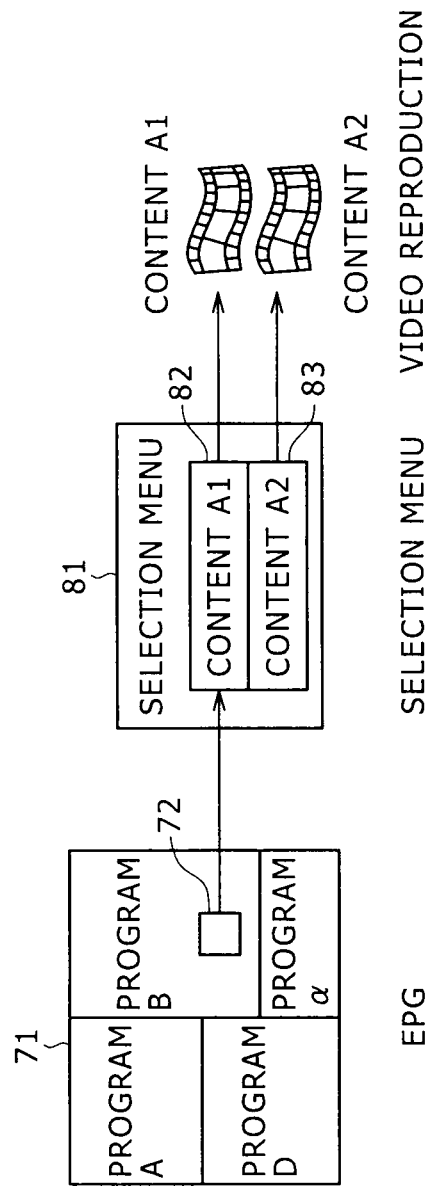
FIG. 5 is a schematic diagram illustrating a display example of a program guide and a selection menu.

For example, if the content associated with program B is identified to be content A1 and content A2 on the basis of the information contained in the program link information DB 51, then a link mark 72 is displayed in the box of program B in an EPG (program guide) 71 that is displayed on the display monitor of the terminal 11 as shown in FIG. 5, for example. A program guide, such as this, is generated on the basis of attribute "program ID" and attribute "program content ID" of the record 51a described above.

It should be noted that the description is made about an example in which the program guide 71 in a tabular form (or grid form) is displayed on the display monitor of the terminal 11; it is also practicable to display a program guide, such as a program list (containing two or more programs) or a program comment screen (providing information describing one program).

The link mark 72 is displayed as a part of GUI (Graphical User Interface), for example. Alternatively, a display box of each program in an EPG may be displayed as a part of GUI. Namely, when the link mark 72 is operated, a command for reproducing the content corresponding to that program is controlled.

It should be noted that content A1 and content A2 are assumed to have been recorded to the disk 12 loaded on the terminal 11.

For example, when the user clicks the link mark 72 (or the display box of program B) by operating a remote commander, not shown, for example, a content selection menu 81 is displayed on the display monitor for example of the terminal 11. Here, the selection menu 81 is displayed as a GUI.

Then, when the user presses a button 82 of the selection menu by operating the remote command for example, content A1 recorded to the disk 12 is reproduced. When a button 83 of the selection menu is pressed, content A2 recorded to the disk 12 is reproduced.

For example, if the content associated with program B is identified to be content B1 on the basis of the information included in the program link information DB 51, then the link mark 72 is also displayed in the display box of program B in the EPG 71 displayed on the display monitor for example of the terminal 11 as shown in FIG. 6. It should be noted that content B1 is assumed to be recorded not to the disk 12 (hereafter referred to as disk A) currently loaded on the terminal 11 but to another disk 12 (hereafter referred to as disk B).

For example, when the user clicks the link mark 72 (or the display box of program B) by operating the remote commander for example, the selection menu 81 is also displayed on the display monitor for example of the terminal 11.

Then, when the user presses a button 84 of the selection menu by operating the remote command for example, a dialog box 91 is displayed on the display monitor for example of the terminal 11. In this example, "Load disk B" is shown in the dialog box 91. The dialog box 91 is displayed on the basis of attribute "disk information" of the record 51a of the program link information DB 51, for example.

Control of the displaying of the dialog box as shown above is executed on the basis of the above-mentioned attribute "disk information" of the record 51a.

When disk B is loaded on the terminal 11, content B1 recorded to disk B is reproduced.

In the network system 10 thus configured, the provision of more substantial information to users can be realized, for example. For example, assume that program A that is a serial drama be being broadcast in terrestrial digital broadcasting and the disk 12 be provided as an appendix to a magazine that introduces television programs.

For example, assume that program preview content is recorded to the disk 12 that is an appendix to the issue of December 2006 of a magazine and content of program A highlight description and cast interview is recorded to the issue of January 2007 of the magazine as shown in FIG. 7. It is also assumed that content of the outline of the last month of program A and the highlight of this month be recorded to the disk 12 that is an appendix to the issues of February through April 2007 of the magazine.

For example, when the user displays the EPG on the display monitor of the terminal 11 in December 2006 and clicks the link mark of the box of program A, a dialog box is displayed to prompt the user to load the disk 12 of the appendix to the issue of December 2006. When the user loads the disk 12 of the appendix to the issue of December 2006 as prompted, the program preview content of program A is reproduced.

When the user displays the EPG on the display monitor of the terminal 11 in March 2007 and clicks the link mark in the box of program A, a dialog box is shown to prompt the user to load the disk 12 of the appendix to the issue of March 2007. When the user loads the disk 12 of the appendix to the issue of March 2007 as prompted, the content for introducing the highlight of program A to be broadcast in March 2007 and the content for introducing the outline of the highlight of program A broadcast till February 2007 are reproduced. Alternatively, it is practicable to display dialog box "If you want the outlines of the programs broadcast in January 2007, load the disk appended to the issue of January 2007," for example.

For example, assume that program C that is a sport program to be broadcast continuously be broadcast in terrestrial digital broadcasting and the disk 12 be provided as an appendix to a sport magazine.

As shown in FIG. 8, for example, assume that content of the victory scene of professional baseball team Osaka be recorded to the disk 12 that is an appendix to the issue of October 2003 of the magazine and content of the victory scene of professional baseball team Nagoya be recorded to the disk 12 that is an appendix to the issue of October 2004. Also, assume that content of the victory scene of professional baseball team Osaka be recorded to the disk 12 that is an appendix to the issue of October 2005, content of the victory scene of professional baseball team Nagoya be recorded to the disk 12 that is an appendix to the issue of October 2006, and content of the victory scene of professional baseball team Tokyo be recorded to the disk 12 that is an appendix to the issue of October 2007.

For example, when the user displays the EPG on the display monitor of the terminal 11 and clicks the link mark of the box of program C, a dialog box is shown to prompt the user to load the disk 12 that is an appendix to the issue of October 2006. When the disk 12 that is an appendix to the issue of October 2006 is loaded as prompted, the content of the victory scene of Nagoya team is reproduced and, at the same time, dialog box "To see the last victory, load the disk appended to the issue of October 2004" is shown.

As described above and according to the embodiment, the information that cannot be displayed by EPG can be presented to the user (can be viewed by the user) as content. In addition, the content to be presented to the user is identified on the basis of program link information, so that the user can view the appropriate content in accordance with the number of times programs are broadcast and program broadcasting timings, for example.

Figure 9:
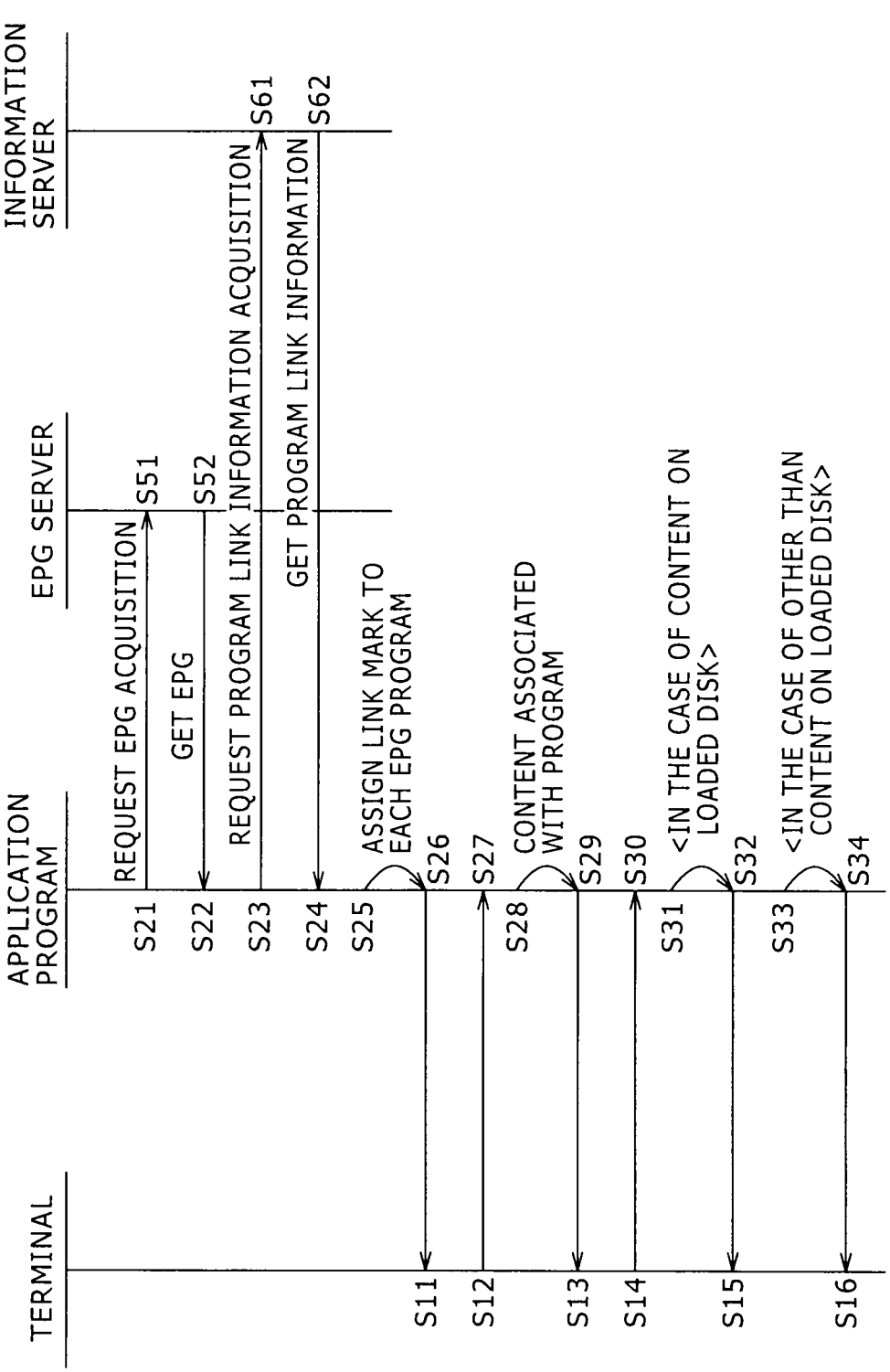
FIG. 9 is an arrow chart indicative of a flow of processing associated with the display of an EPG and the reproduction of content.

The following describes a flow of the processing associated with EPG display and content reproduction that are executed in the network system 10, with reference to the arrow chart shown in FIG. 9.

In step S21, an application program recorded to the disk 12 loaded on the terminal 11 transmits an EPG acquisition request to the EPG server 14. In step S51, this request is received by the EPG server 14.

In step S52, the EPG server 14 transmits the EPG data stored in the EPG DB 41 to the terminal 11. In step S22, the EPG data is received by the application program of the terminal 11.

In step S23, the application program transmits a program link information acquisition request to the program link information server 15. In step S61, this request is received by the program link information server 15.

In step S62, the program link information server 15 transmits the data of program link information recorded to the program link information DB 51. In step S24, this data is received by the application program of the terminal 11.

In step S25, the application program generates EPG display data attached with a link mark on the basis of the EPG data received in step S22 and the program link information data received in step S24 and supplies the generated EPG display data to the terminal 11 in step S26.

In step S11, the terminal 11 displays the EPG (program guide) attached with a link mark onto the display monitor and accepts the selection of the link mark or the selection of the program display box by the user. At this moment, the EPG 71 shown in FIG. 5 or FIG. 6 is displayed.

In step S12, the terminal 11 supplies the link mark selected by the user or the information for identifying the program display box to the application program. In step S27, the link mark or the information is received by the application program.

In step S28, the application program generates the display data for displaying a selection menu screen for the content corresponding to the selected link mark or the program display box and supplies the generated display data to the terminal 11 in step S29.

In step S13, the terminal 11 displays the content selection menu screen on the display monitor and accepts the selection of content by the user. At this moment, the selection menu 81 shown in FIG. 5 or FIG. 6 is displayed.

In step S14, the terminal 11 supplies the information for identifying the content selected by the user to the application program. In step S30, this information is received by the application program.

If the content corresponding to the selected link mark or the program display box is recorded to the disk 12 loaded on the terminal 11, then application program reads the data of that content from the disk 12 and reproduces the content in step S31. In step S32, the application supplies the data of the reproduced content to the terminal 11.

In step S15, the terminal 11 displays the reproduced content on the display monitor.

If the content corresponding to the selected link mark or the program display box is not recorded to the disk 12 loaded on the terminal 11, then the application program generates the display data for displaying a dialog box for prompting the loading of the disk 12 to which the data of that content is recorded in step S33. In step S34, the application supplies the generated display data to the terminal 11.

In step S16, the terminal 11 displays the dialog box on the display monitor.

It should be noted that the processing by the application program shown in FIG. 9 may be all executed by the application program recorded to the disk 12 or by both the application program recorded to the disk 12 and an application program recorded to a memory for example of the terminal 11.

In the arrow chart shown in FIG. 9, the terminal 11 and the application program are described as entities that execute processing operations individually; however, because the application program recorded to the disk 12 is executed by the control block 21 of the terminal 11 when the disk 12 is reproduced as described above, the processing of the application program shown in the arrow chart of FIG. 9 is actually executed by the terminal 11.

As described above, the processing associated with EPG display and content reproduction is executed.

The information that is obtained from related-art EPGs is only limited one, such as program title, program outline, and main cast, for example. However, many audiences may want to know the contents of programs in which main cast acted in the past and check the contents of past broadcasts in programs that are broadcast in series, for example. However, if the information desired by audiences is to be transmitted via a network for example for each of the huge number of programs that are broadcast by terrestrial digital broadcast and satellite broadcast, for example, the amounts of data to be transmitted become huge, thereby making the transmission inefficient when network transmission rates are considered.

In the embodiments of the present invention, EPG information and program link information are transmitted to read the content associated with a particular program from the disk 12 for reproduction, thereby satisfying user requests, such as knowing the contents of programs in which main cast acted in the past and checking the contents of past broadcasts in programs that are broadcast in series, for example.

Also, in the embodiments of the present invention, the content associated with programs is recorded to the disk 12 and distributed separately from the EPGs, so that huge amounts of data need not be transmitted and therefore there is little restriction on network transmission rates, thereby allowing the user to view content more substantial than that provided by related-art technologies.

Figure 10:
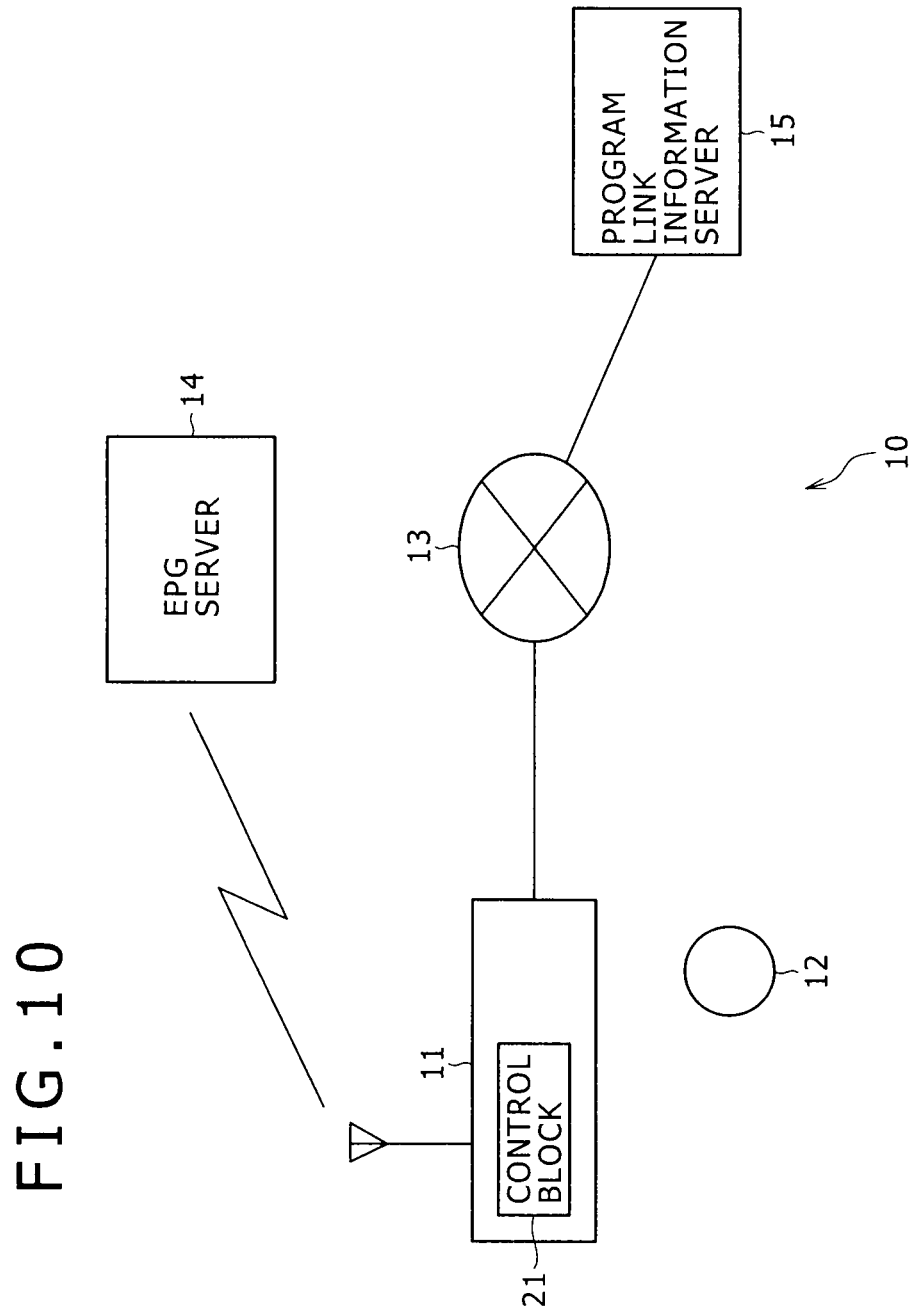
FIG. 10 is block diagram illustrating an exemplary configuration of another network system practiced as one embodiment of the invention.

It should be noted that, with reference to FIG. 1, the terminal 11 gets EPG data and program link information data via the network 13; however, if the terminal 11 contains a tuner, it is also practicable for the terminal 11 to receive EPG data via broadcast waves as shown in FIG. 10, for example. In the example shown in FIG. 10, the EPG server 14 is arranged in a broadcast station for example and the EPG data stored in the EPG server 14 is encoded and transmitted as multiplexed with broadcast wave, which is received by an antenna connected to the tuner of the terminal 11.

If the terminal 11 receives EPG data, the processes of steps S21, S22, S51, and S52 shown in FIG. 9 are each executed via broadcast wave.

In the above-mentioned examples, an EPG is mainly displayed and the content corresponding to programs listed in the EPG is reproduced; it is also practicable to reproduce the content recorded to the disk 12 on the terminal 11 and timer-record the program corresponding to the reproduced content, for example.

Figure 11:
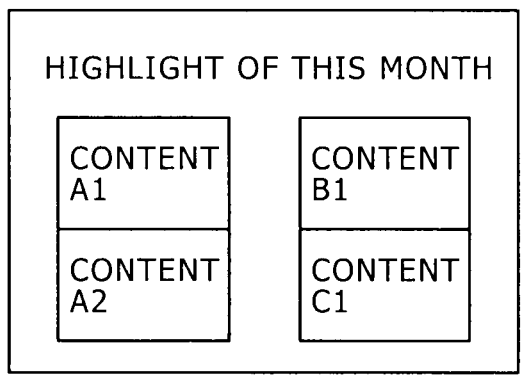
FIG. 11 is a diagram illustrating an exemplary screen for displaying content recorded to a disk.
Figure 12:
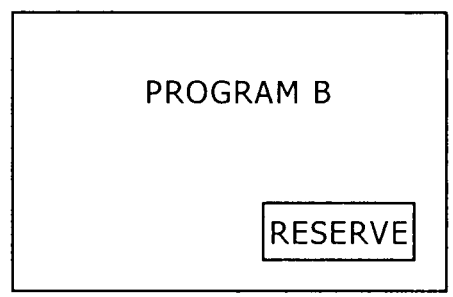
FIG. 12 is a diagram illustrating an exemplary small screen displayed on a display monitor of a terminal.

For example, a configuration may be provided in which, if the content selection menu as shown in FIG. 11 is shown on the display monitor of the terminal 11 and content B1 is selected from the content selection menu, content B1 is reproduced to be shown on the display monitor of the terminal 11 and, at the same time, the timer-recording screen of program B corresponding to content B1 is shown on the display monitor of the terminal 11 as a small screen as shown in FIG. 12, for example.

Figure 13:
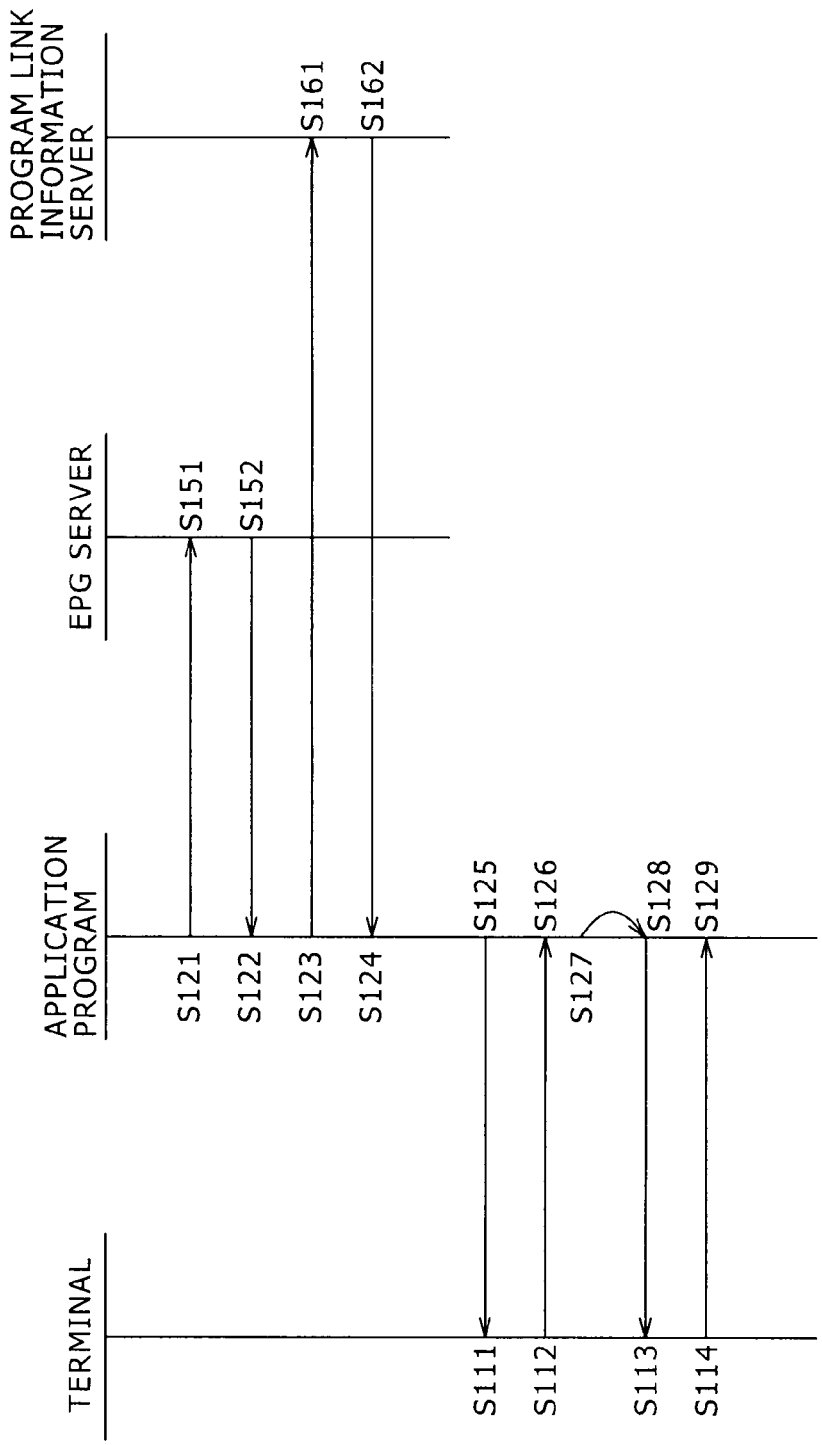
FIG. 13 is an arrow chart indicative of a flow of processing associated with timer recording of a program corresponding to reproduced content.

The following describes a flow of the processing associated with the timer-recording of a program corresponding to the reproduced content in the network system 10, with reference to an arrow chart shown in FIG. 13.

The processes in steps S121 through S124, steps S151 and S152, and steps S161 and S162 are substantially the same as those of steps S21 through S24, steps S51 and S52, and steps S61 and S62 shown in FIG. 9, so that the detail description thereof will be skipped.

In step S125, an application program generates the display data of a content selection menu screen and supplies the generated display data to the terminal 11.

In step S111, the terminal 11 displays the content selection menu screen on the display monitor and accepts the selection of content by the user. At this moment, a screen as shown in FIG. 11 for example is shown on the display monitor of the terminal 11.

In step S112, the terminal 11 supplies information for identifying the content selected by the user to the application program. In step S126, this information is received by the application program.

In step S127, the application program gets the information, such as program title, broadcast date, and broadcast channel, of the program corresponding to the selected content. At this moment, on the basis of the data of program link information obtained in step S124, the program ID corresponding to the content ID of the selected content is identified and the information, such as program title, broadcast date, and broadcast channel, corresponding to the program ID on the basis of the EPG data obtained in step S122.

In step S128, the application program generates the display data for a timer-recording screen of a program on the basis of the information obtained in step S127, for example, and supplies the generated display data to the terminal 11.

In step S113, the terminal 11 displays the program timer-recording screen on the display monitor as a small screen. Then, the terminal 11 accepts commands for timer-recording entered by the user. At this moment, a screen as shown in FIG. 12 is shown on the display monitor of the terminal 11 as a small screen.

It should be noted that the image shown in FIG. 12 need not always be a small screen; for example, the image may be displayed in a normal size on the display monitor during or after the reproduction of the content associated with a program.

In step S114, the terminal 11 supplies the data corresponding to the timer-recording command entered by the user to the application program. In step S129, the timer-recording of a program is set by the application program.

It should be noted that the processing of the application program shown in FIG. 13 may all be executed by an application program recorded to the disk 12 or by both the application program recorded to the disk 12 and an application program recorded to a memory for example of the terminal 11.

In the arrow chart shown in FIG. 13, the terminal 11 and the application program are described as the entities of individually executing processing operations; however, because the application program recorded to the disk 12 is executed by the control block 21 of the terminal 11 when the disk 12 is reproduced as described above, the processing of the application program in the arrow chart shown in FIG. 13 is actually executed by the terminal 11.

Thus, the processing associated with the timer-recording of a program corresponding to reproduced content is executed.

Figure 14:
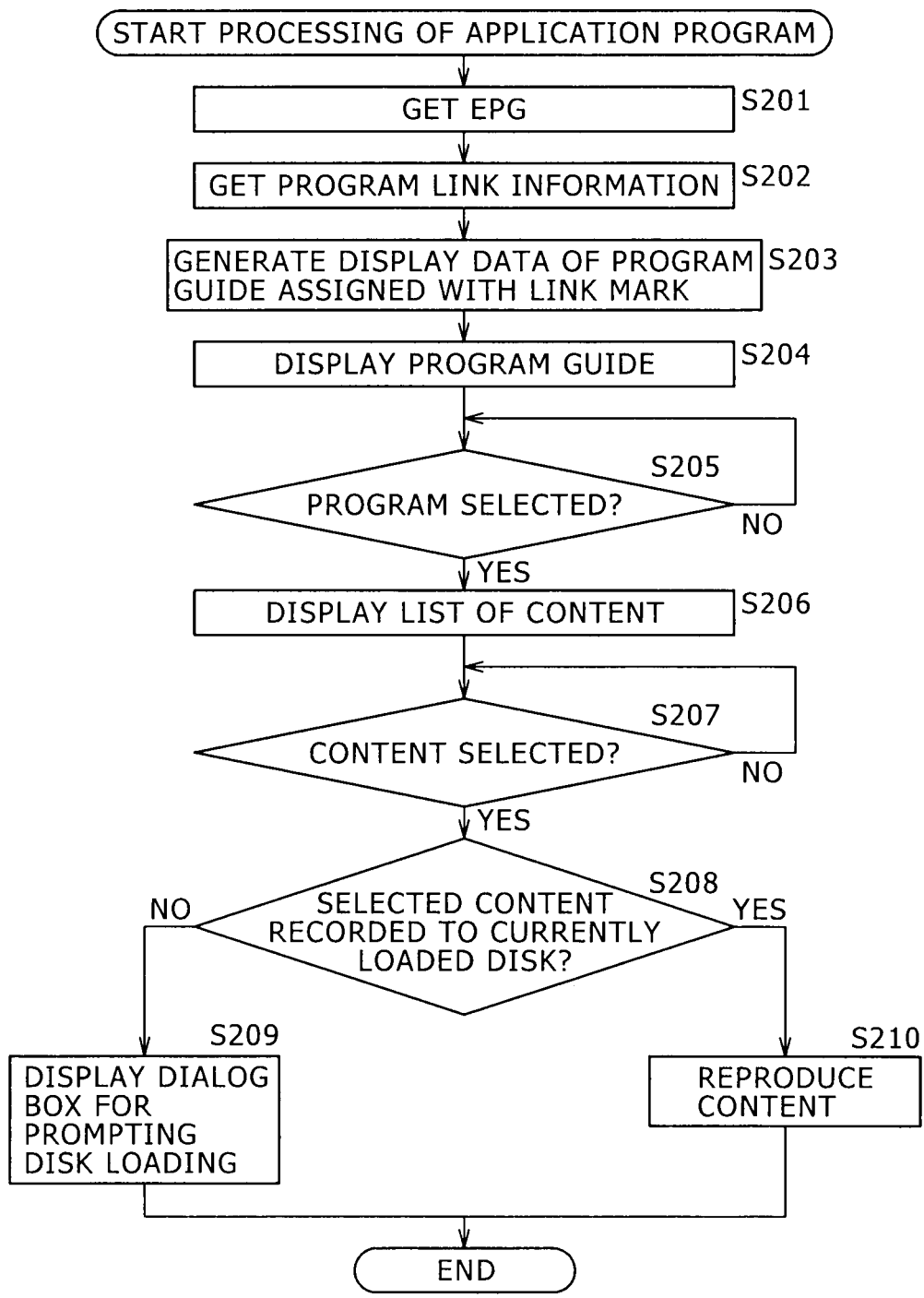
FIG. 14 is a flowchart for describing, in detail, the processing of an application program shown in FIG. 9.

The following describes in detail the processing of the application program shown in FIG. 9, with reference to a flowchart shown in FIG. 14. This processing is executed when the disk 12 is loaded on the terminal 11.

In step S201, the application program recorded to the disk 12 transmits an EPG acquisition request to the EPG server 14 and receives the EPG data stored in the EPG DB 41 from the EPG server 14. It should be noted that this processing corresponds to the processing of steps S21 and S22 shown in FIG. 9.

In step S202, the application program transmits a program link information acquisition request to the program link information server 15 and receives the data of program link information stored in the program link information DB 51 from the program link information server 15. It should be noted that this processing corresponds to the processing of steps S23 and S24 shown in FIG. 9.

In step S203, the application program generates the display data of a program guide (EPG) attached with a link mark on the basis of the EPG data obtained in step S201 and the data of program link information obtained in step S202 as described above with reference to FIGS. 5 and 6. It should be noted that this processing corresponds to the processing of steps S25 and S26 shown in FIG. 9.

In step S204, the application program displays the EPG attached with the link mark on the display monitor of the terminal 11. At this moment, the program guide 71 shown in FIG. 5 or 6 is displayed. It should be noted that this processing corresponds to the processing of step S11 shown in FIG. 9.

In step S205, the application program determines whether a program display box (or a link mark) has been selected by the user and waits until the selection of a program display box is determined. If the selection of a program display box is determined in step S205, the procedure goes to step S206.

In step S206, the application program generates the display data of a content selection menu screen corresponding to the selected program display box (or link mark) and displays the content selection menu screen on the display monitor of the terminal 11. At this moment, the selection menu shown in FIG. 5 or 6 is displayed, for example. It should be noted that this processing corresponds to the processing of steps S28, S29, and S31 shown in FIG. 9.

In step S207, the application program determines whether content has been selected by the user and waits until the selection of content is determined. If the selection of content is determined in step S207, the procedure goes to step S208.

In step S208, the application program determines whether the content determined selected in step S207 is the content recorded to the disk 12 loaded on the terminal 11.

If the selected content is found to be the content recorded to the disk 12 loaded on the terminal 11 in step S208, then the procedure goes to step S210, in which the application program controls the reproduction of that content. It should be noted that this processing corresponds to the processing of steps S31, S32, and S15 shown in FIG. 9.

On the other hand, if the selected content is found not to be the content recorded to the disk 12 loaded on the terminal 11, then the procedure goes to step S209, in which the application program displays a dialog box prompting the user to load a disk to which that content is recorded onto the display monitor for example of the terminal 11. At this moment, the dialog box 91 shown in FIG. 6 for example is shown on the display monitor of the terminal 11. It should be noted that this processing corresponds to the processing of steps S33, S34, and S16 shown in FIG. 9.

Thus, the processing of the application program is executed.

In the above-mentioned examples, embodiments of the present invention are applied to an EPG (program guide) and the reproduction of the content corresponding to each program; it is also practicable to apply embodiments of the present invention otherwise. For example, the application of embodiments of the present invention allows the distribution of the disk 12 as an appendix to a horse race magazine for example and, if race cards are receivable by network or broadcast wave, the displaying of race cards for user selection, thereby reproducing the video of past races.

In the above-mentioned examples, the description is made with the assumption that the disk 12 be loaded on the terminal 11; however, disk recording media need not always be loaded. For example, embodiments of the present invention are applicable to recording media, such as USB (Universal Serial Bus) memories and IC cards.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer as shown in FIG. 15 for example in which various programs may be installed for the execution of various functions.

Figure 15:
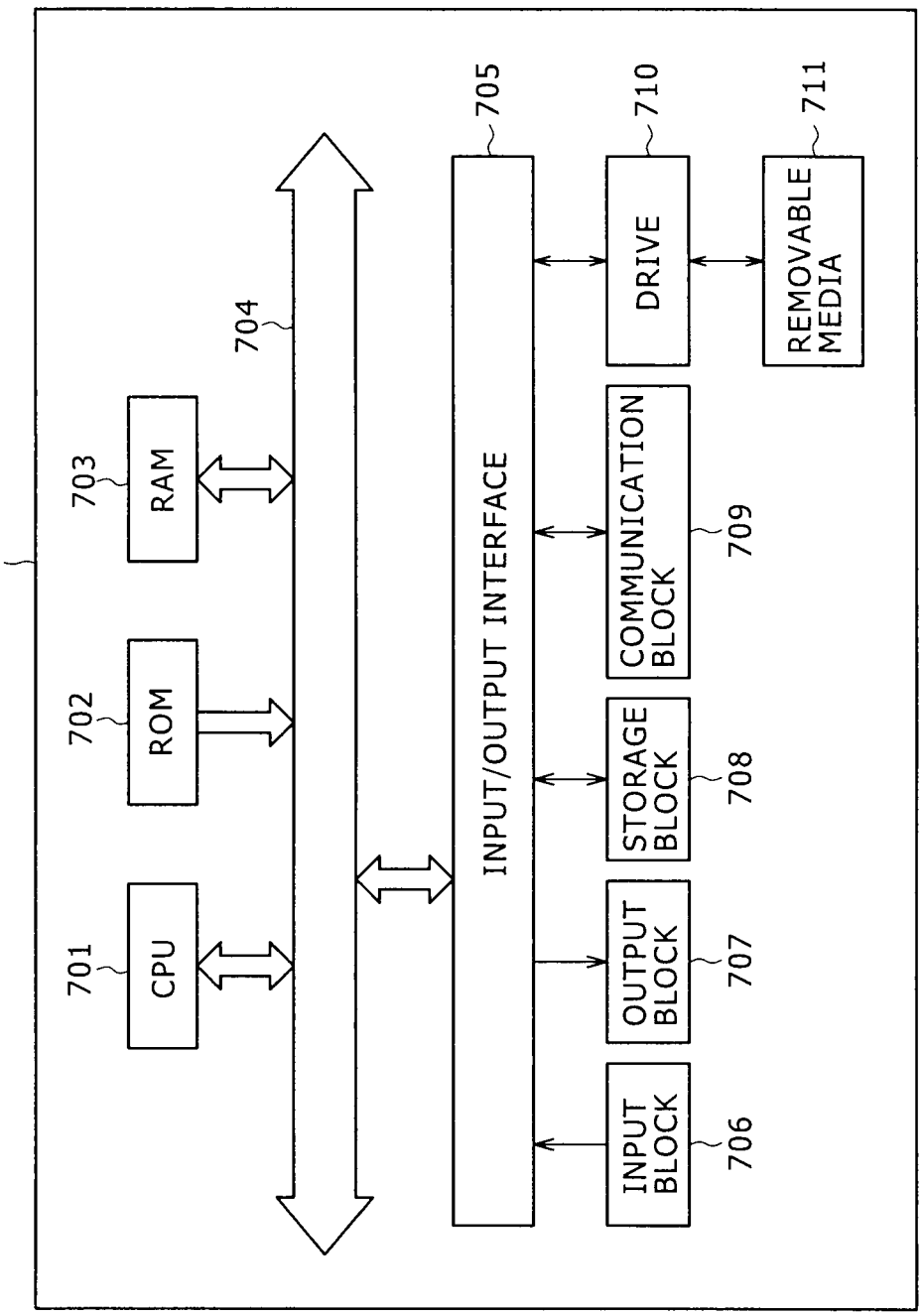
FIG. 15 is an exemplary configuration of a personal computer.

Namely, the terminal 11 shown in FIG. 1 may also be configured as shown in FIG. 15.

In FIG. 15, a CPU (Central Processing Unit) 701 executes various processing operations as instructed by a program stored in a ROM (Read Only Memory) 702 or loaded from a storage block 708 into a RAM (Random Access Memory) 703. The RAM 703 also stores data for example necessary for the CPU 701 to execute various processing operations.

The CPU 701, the ROM 702, and the RAM 703 are interconnected via a bus 704. The bus 704 is also connected with an input/output interface 705.

The input/output interface 705 is connected with an input block 706 having a keyboard and a mouse, for example, an output block 707 having a display monitor based on CRT (Cathode Ray Tube) or LCD (Liquid Crystal Display) and a loudspeaker, for example, the storage block 708 based on a hard disk drive for example, and a communication block 709 based on a modem and a network interface card such as a LAN (Local Area Network) card, for example. The communication block 709 executes communication processing via a network including the Internet.

The input/output interface 705 is also connected with a drive 710 as demanded, on which a removable media, such as a magnetic disk, an optical disk, a magneto-optical disk, or a semiconductor memory is loaded, from which a computer program is installed in the storage block 708 as demanded.

When the above-mentioned sequence of processing is executed by software, programs constituting the software are installed from a network, such as the Internet, or a recording media, such as the removable media 711.

The above-mentioned recording medium is configured not only by the removable medium 711 such as a magnetic disc in which a program is stored (including a floppy Disc™), an optical disc (including CD-ROM (Compact Disc Read Only Memory), DVD (Digital Versatile Disc), a magneto-optical disc (including MD (Mini Disc)™), or a semiconductor memory recorded with programs for distribution of programs to users separately from the apparatus main, but also by the ROM 702 recorded with programs and a hard disc drive recorded with programs and included in the storage block 708 that are provided to users as incorporated in the apparatus main as shown in FIG. 15.

It should be noted herein that the steps for describing each program recorded in recording media include not only the processing operations which are sequentially executed in a time-dependent manner but also the processing operations which are executed concurrently or discretely.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   circuitry configured to:
   receive program distribution schedule information for a plurality of broadcast programs via a network from a first server, the received program distribution schedule information including a unique program identifier corresponding to each of the plurality of broadcast programs, such that the received program distribution schedule information for each of said plurality of broadcast programs can be accessed based on said unique program identifier corresponding to that program;
   acquire, from a second server via the network or another network, a first program link information which corresponds to a first broadcast program present in the received program distribution schedule information and which identifies information about a recorded first related program content that is determined to be related specifically to said first broadcast program, wherein said acquired first program link information comprises program identification information corresponding to the unique program identifier of said first broadcast program, wherein said acquired first program link information further comprises a related program content identifier of said recorded first related program content, and a corresponding recording media identifier, which distinguishably identifies a specific non-transitory recording media, among a plurality of non-transitory recording media, on which said first related program content is recorded, such that said recorded first related program content can be selectively retrieved from said specific non-transitory recording media, when said specific non-transitory recording media is loaded on said information processing apparatus, and wherein an indication is stored by said second server that said recorded first related program content was previously recorded to said specific non-transitory recording media prior to acquiring the first program link information;

generate an electronic program guide for display, based on the received program distribution schedule information and based on said program identification information in said acquired first program link information, by allocating a GUI corresponding to said acquired first program link information into a display box for said first broadcast program;

control a command for reproducing said recorded first related program content, upon receiving a user selection of said GUI, by retrieving said recorded first related program content from said specific non-transitory recording media, when said specific non-transitory recording media, distinguishably identified based on the recording media identifier corresponding to said first related program content identifier in said acquired first program link information, is loaded on said information processing apparatus, wherein the received program distribution schedule information does not include said recorded first related program content or the related program content identifier of said recorded first related program content, wherein said acquired first program link information does not include said recorded first related program content, wherein each of said plurality of non-transitory recording media have at least recorded thereon, one or more related program contents and their corresponding related program content identifier, such that each of the one or more related program contents, stored on one of said plurality of non-transitory recording media, can be selectively retrieved from that recording media based on their corresponding related program content identifier, when that recording media is loaded on said information processing apparatus, and wherein each of said plurality of non-transitory recording media have at most recorded thereon, an application program in addition to the one or more related program contents and their corresponding related program content identifier, and wherein said application program is recorded on only one or more of said plurality of non-transitory recording media; and execute said application program, from a currently loaded non-transitory recording media, from among said one or more of said plurality of non-transitory recording media with said application program recorded thereon, wherein the circuitry is configured to receive the program distribution schedule information in response to an acquisition request by executing said application program.

2. The information processing apparatus according to claim 1, wherein when the reproduction of said recorded first related program content is commanded through said user selection of said GUI, the circuitry is configured to identify whether the recording media identifier, distinguishably identifying said specific non-transitory recording media, associated with said recorded first related program content in said acquired program link information, matches said currently loaded non-transitory recording media, wherein if it is identified that said specific non-transitory recording media matches said currently loaded non-transitory recording media, the circuitry is configured to determine that said recorded first related program content is found on said currently loaded non-transitory recording media and selectively identify said recorded first related program content on currently loaded non-transitory recording media based on the related program content identifier of the recorded first related program content in said acquired first program information link, and control the reproduction of said identified recorded first related program content by retrieving it from said currently loaded non-transitory recording media, and if the recording media identifier of said specific non-transitory recording media associated with said recorded first related program content does not match said currently loaded non-transitory recording media, the circuitry is configured to determine that said recorded first related program content is not found on said currently loaded recording media, and control display of information relating to said specific non-transitory recording media associated with said recorded first related program content in said acquired program link information.

3. The information processing apparatus according to claim 2, wherein the reproduction of said recorded first related program content further displays an option for a timer-recording of said first broadcast program.

4. The information processing apparatus according to claim 1, wherein the circuitry is configured to further acquire a second program link information which corresponds to a second broadcast program present in the received program distribution schedule information and identify information about a recorded second related program content that is determined to be related specifically to said second broadcast program, wherein the circuitry is configured to display the electronic program guide comprising a plurality of display boxes for more than one broadcast program, including said first and second broadcast programs, wherein each of first and second display boxes including a selectable portion that, upon selecting of which, causes said electronic program guide to display a menu associated with a respective first and second acquired program link information, and wherein upon a selection of one of said first or second program link information from said menu, initiate a determination, by the circuitry, as to whether the recording media corresponding to the recording media identifier associated with respective recorded first or second related program content identifiers is accessible to said information processing apparatus.

5. The information processing apparatus according to claim 1,
wherein the circuitry is configured to further acquire a second program link information which corresponds to said first broadcast program present in the received program distribution schedule information, and identify information about a recorded second related program content that is determined to be related specifically to said first broadcast program, and
wherein the circuitry is configured to display a menu corresponding to said first broadcast program, said menu comprising information corresponding to said first and second acquired program link information, and upon receiving a selection corresponding to either of said first and second acquired program link information, the circuitry is configured to determine whether said recorded first and second related program contents corresponding to said selection is recorded on said currently loaded non-transitory recording media.

6. The information processing apparatus according to claim 5, wherein when the selected one of said recorded first and second related program contents is recorded on said currently loaded non-transitory recording media, the circuitry is configured to control display of the selected one of said recorded first and second related program contents.

7. The information processing apparatus according to claim 5, wherein when the selected one of said recorded first and second related program contents is not recorded on said currently loaded non-transitory recording media, the circuitry is configured to control display of a dialog box to prompt loading of one of said specific non-transitory recording media corresponding to the recording media identifier on which said selected one of said recorded first and second related program contents is recorded.

8. An information processing method comprising:
receiving, using circuitry of an information processing apparatus, program distribution schedule information for a plurality of broadcast programs via a network from a first server, the received program distribution schedule information including a unique program identifier corresponding to each of the plurality of broadcast programs, such that the received program distribution schedule information for each of said plurality of broadcast programs can be accessed based on said unique program identifier corresponding to that program;
acquiring, from a second server via the network or another network, a first program link information which corresponds to a first broadcast program present in the received program distribution schedule information and which identifies information about a recorded first related program content that is determined to be related specifically to said first broadcast program,
wherein said acquired first program link information comprises program identification information corresponding to the unique program identifier of said first broadcast program,
wherein said acquired first program link information further comprises a related program content identifier of said recorded first related program content, and a corresponding recording media identifier, which distinguishably identifies a specific non-transitory recording media, among a plurality of non-transitory recording media, on which said first related program content is recorded, such that said recorded first related program content can be selectively retrieved from said specific non-transitory recording media, when said specific non-transitory recording media is loaded on said information processing apparatus, and
wherein an indication is stored by said second server that said recorded first related program content was previously recorded to said specific non-transitory recording media prior to said acquiring;
generating an electronic program guide for display, based on the received program distribution schedule information and based on said program identification information in said acquired first program link information, by allocating a GUI corresponding to said acquired first program link information into a display box for said first broadcast program;
controlling a command for reproducing said recorded first related program content, upon receiving a user selection of said GUI, by retrieving said recorded first related program content from said specific non-transitory recording media, when said specific non-transitory recording media, distinguishably identified based on the recording media identifier corresponding to said first related program content identifier in said acquired first program link information, is loaded on said information processing apparatus;
wherein the received program distribution schedule information does not include said recorded first related program content or the related program content identifier of said recorded first related program content,
wherein said acquired first program link information does not include said recorded first related program content,
wherein each of said plurality of non-transitory recording media have at least recorded thereon, one or more related program contents and their corresponding related program content identifier, such that each of the one or more related program contents, stored on one of said plurality of non-transitory recording media, can be selectively retrieved from that recording media based on their corresponding related program content identifier, when that recording media is loaded on said information processing apparatus, and
wherein each of said plurality of non-transitory recording media have at most recorded thereon, an application program in addition to the one or more related program contents and their corresponding related program content identifier, and wherein said application program is recorded on only one or more of said plurality of non-transitory recording media; and
executing said application program, from a non-transitory recording media currently loaded on said information processing apparatus, from among said one or more of said plurality of non-transitory recording media with said application program recorded thereon, wherein the circuitry is configured to receive the program distribution schedule information in response to an acquisition request by said executing said application program.

9. A non-transitory computer readable storage medium including computer readable instructions that, when executed by a computer, cause the computer to execute a method comprising:
receiving program distribution schedule information for a plurality of broadcast programs via a network from a first server, the received program distribution schedule information including a unique program identifier corresponding to each of the plurality of broadcast programs, such that the received program distribution schedule information for each of said plurality of broadcast programs can be accessed based on said unique program identifier corresponding to that program;

acquiring, from a second server via the network or another network, a first program link information which corresponds to a first broadcast program present in the received program distribution schedule information and which identifies information about a recorded first related program content that is determined to be related specifically to said first broadcast program, wherein said acquired first program link information comprises program identification information corresponding to the unique program identifier of said first broadcast program, wherein said acquired first program link information further comprises a related program content identifier of said recorded first related program content, and a corresponding recording media identifier, which distinguishably identifies a specific non-transitory recording media, among a plurality of non-transitory recording media, on which said first related program content is recorded, such that said recorded first related program content can be selectively retrieved from said specific non-transitory recording media, when said specific non-transitory recording media is loaded on an information processing apparatus, and wherein an indication is stored by said second server that said recorded first related program content was previously recorded to said specific non-transitory recording media prior to said acquiring;

generating an electronic program guide for display, based on the received program distribution schedule information and based on said program identification information in said acquired first program link information, by allocating a GUI corresponding to said acquired first program link information into a display box for said first broadcast program;

controlling a command for reproducing said recorded first related program content, upon receiving a user selection of said GUI, by retrieving said recorded first related program content from said specific non-transitory recording media, when said specific non-transitory recording media, distinguishably identified based on the recording media identifier corresponding to said first related program content identifier in said acquired first program link information, is loaded on said information processing apparatus;

wherein the received program distribution schedule information does not include said recorded first related program content or the related program content identifier of said recorded first related program content, wherein said acquired first program link information does not include said recorded first related program content, wherein each of said plurality of non-transitory recording media have at least recorded thereon, one or more related program contents and their corresponding related program content identifier, such that each of the one or more related program contents, stored on one of said plurality of non-transitory recording media, can be selectively retrieved from that recording media based on their corresponding related program content identifier, when that recording media is loaded on said information processing apparatus, and wherein each of said plurality of non-transitory recording media have at most recorded thereon, an application program in addition to the one or more related program contents and their corresponding related program content identifier, and wherein said application program is recorded on only one or more of said plurality of non-transitory recording media; and executing said application program, from a non-transitory recording media currently loaded on said information processing apparatus, from among said one or more of said plurality of non-transitory recording media with said application program recorded thereon, wherein circuitry is configured to receive the program distribution schedule information in response to an acquisition request by said executing said application program.

10. An information processing apparatus comprising:

a program distribution schedule information receiver configured to receive program distribution schedule information for a plurality of broadcast programs via a network from a first server, the received program distribution schedule information including a unique program identifier corresponding to each of the plurality of broadcast programs, such that the received program distribution schedule information for each of said plurality of broadcast programs can be accessed based on said unique program identifier corresponding to that program;

an information acquirer configured to acquire, from a second server via the network or another network, a first program link information which corresponds to a first broadcast program present in the received program distribution schedule information and which identifies information about a recorded first related program content that is determined to be related specifically to said first broadcast program, wherein said acquired first program link information comprises program identification information corresponding to the unique program identifier of said first broadcast program, wherein said acquired first program link information further comprises a related program content identifier of said recorded first related program content, and a corresponding recording media identifier, which distinguishably identifies a specific non-transitory recording media, among a plurality of non-transitory recording media, on which said first related program content is recorded, such that said recorded first related program content can be selectively retrieved from said specific non-transitory recording media, when said specific non-transitory recording media is loaded on said information processing apparatus, and wherein an indication is stored by said second server that said recorded first related program content was previously recorded to said specific non-transitory recording media prior to acquiring the first program link information;

a display controller configured to generate an electronic program guide for display, based on the received program distribution schedule information and based on said program identification information in said acquired first program link information, by allocating a GUI corresponding to said acquired first program link information into a display box for said first broadcast program, and a command for reproducing said recorded first related program content, upon receiving a user selection of said GUI, by retrieving said recorded first related program content from said specific non-transitory recording media, when said specific non-transitory recording media, distinguishably identified based on the recording media identifier corresponding to said first related program content identifier in said acquired first program link information, is loaded on said information processing apparatus, wherein the received program distribution schedule information does not include said recorded first related program content or the related program content identifier of said recorded first related program content, wherein said acquired first program link information does not include said recorded first related program content, wherein each of said plurality of non-transitory recording media have at least recorded thereon, one or more related program contents and their corresponding related program content identifier, such that each of the one or more related program contents, stored on one of said plurality of non-transitory recording media, can be selectively retrieved from that recording media based on their corresponding related program content identifier, when that recording media is loaded on said information processing apparatus, and wherein each of said plurality of non-transitory recording media have at most recorded thereon, an application program in addition to the one or more related program contents and their corresponding related program content identifier, and wherein said application program is recorded on only one or more of said plurality of non-transitory recording media; and an execution controller configured to execute said application program, from a currently loaded non-transitory recording media, from among said one or more of said plurality of non-transitory recording media with said application program recorded thereon, wherein said program distribution schedule information receiver is configured to receive the program distribution schedule information in response to an acquisition request by executing said application program.

* * * * *